United States Patent
Kemnitz et al.

[11] Patent Number: 6,048,126
[45] Date of Patent: Apr. 11, 2000

[54] MUSHROOM-TYPE PIN RETAINER

[75] Inventors: Peter Kemnitz, Leutenbach; Klaus Keller, Lorch, both of Germany

[73] Assignee: Mahle GmbH, Stuttgart, Germany

[21] Appl. No.: 09/022,788

[22] Filed: Feb. 12, 1998

[30] Foreign Application Priority Data

Feb. 13, 1997 [DE] Germany ............................. 197 05 488

[51] Int. Cl.[7] ........................................... F16C 11/06
[52] U.S. Cl. ......................... 403/154; 403/153; 92/208; 92/219; 92/190
[58] Field of Search ............................ 403/155, 154, 403/153, 150, 157, 161, 383, 375; 92/172, 208, 212, 216, 219, 190, 189, 187

[56] References Cited

U.S. PATENT DOCUMENTS

| | | | |
|---|---|---|---|
| 1,478,733 | 12/1923 | Cave | 403/151 |
| 1,573,848 | 2/1926 | Murray | 403/155 |
| 1,720,779 | 7/1929 | Brown | 403/153 |
| 1,851,304 | 3/1932 | Fish | 403/154 X |
| 1,923,717 | 8/1933 | Frelin . | |
| 2,295,199 | 9/1942 | Carvelli | 92/187 |
| 2,343,719 | 3/1944 | Ulrich | 92/187 |
| 5,289,758 | 3/1994 | Berlinger | 92/190 |

FOREIGN PATENT DOCUMENTS

| | | |
|---|---|---|
| 430514 | 6/1926 | Germany . |
| 481715 | 8/1929 | Germany . |
| 657010 | 2/1938 | Germany . |
| 699345 | 11/1940 | Germany . |
| 4314892A1 | 11/1993 | Germany . |
| 325211 | 3/1935 | Italy .................................. 403/154 |
| 1236592 | 6/1971 | United Kingdom . |

*Primary Examiner*—Lynne H. Browne
*Assistant Examiner*—David E. Bochna
*Attorney, Agent, or Firm*—Collard & Roe, P.C.

[57] ABSTRACT

A mushroom-type pin retainer for a pin having a central bore and which connects a piston and a piston rod of an internal combustion engine. The pin retainer is comprised of a mushroom head connected to a shaft. The shaft has a section of larger diameter for insertion into the bore of the pin. This section is no longer than 2 mm in an axial direction and is located remote from the mushroom head, so that the pin retainer may swing by a limited angle during mounting in the bore. This configuration makes the assembly simple to mount, even if it is manufactured by an imprecise manufacturing process such as injection molding.

8 Claims, 3 Drawing Sheets

MUSHROOM-TYPE PIN RETAINER

BACKGROUND OF THE INVENTION

1. Field of the Invention

The invention relates to a mushroom-type pin retainer for a pin connecting the piston and piston rod of an internal combustion engine. In particular this invention relates to a mushroom-type pin retainer that allows for simple mounting on into the pin, even when the pin retainer is produced with imprecise manufacturing techniques.

2. The Prior Art

Relatively high precision is normally required in manufacturing a mushroom-type pin retainer, because the assembly must be mountable in the cylinder. It is necessary that the entire circumference of the outer edge of the mushroom head be flush on the surface on which it is supported, i.e., on the face of the pin, so that sufficient play is available with respect to the cylinder bore. However, the known mushroom-type pin retainers are engineered in such a way that full circular abutment of the mushroom head on the supporting surface impossible if even the smallest angular differences or alignment flaws exist between the axis of the mushroom shaft and the axis of the head. Such flaws make it impossible under certain circumstances to mount the assembly in the cylinder bore, or require excessive clearance between the mushroom and the cylinder bore.

SUMMARY OF THE INVENTION

It is therefore an object of the invention to provide a mushroom-type pin retainer that allows the assembly to be correctly mounted, even if such retainers, for example injection molded plastic parts, have manufactured flaws.

The pin retainer according to the invention comprises a a mushroom head connected to a shaft. The shaft has a section of larger diameter for insertion into the bore of the pin. This section is no longer than 2 mm in an axial direction and is located remote from the mushroom head, so that the pin retainer may swing by a limited angle during mounting in the bore. This configuration is simple to mount, even if it is manufactured by an imprecise manufacturing process such as injection molding.

A certain swinging of the mushroom-type pin retainer in the bore is ensured because the section with the largest shaft diameter is relatively narrow. A line-like or quasi line-like abutment of this largest shaft diameter section on the pin may suffice for fixing the mushroom-type pin retainer in the bore of the pin.

In this case, the shaft is capable of swinging with limited angular deflection around any point on its contact surface in the bore and thereby compensates for angular deviations of the mushroom head. This ensures sufficient abutment of the mushroom head on the face of the pin, even in the presence of alignment flaws between the shaft and the head of the mushroom. For this purpose, the section of the shaft having maximum diameter is smaller than 2 mm prior to mounting and preferably smaller than 1 mm.

A mushroom-type pin retainer with a slightly cone-shaped shaft is known from GB 1,236,592. However, the shaft of this mushroom-type pin retainer has a taper toward the end of the shaft (see line 95: . . . of which the outside diameter has a slight taper to fit in the recess 6 . . . ). The conical shape of the mushroom pin therefore serves as a mounting aid and the shaft consequently abuts on the bore with its end disposed adjacent to the mushroom head. However, such a mushroom-type pin retainer offers only limited compensation of alignment flaws between the shaft and the head of the mushroom.

As opposed to GB 1,236,592, the shaft of mushroom-type pin retainer according to the invention has a section of largest diameter disposed remote from the head of the mushroom. This section of largest diameter is inserted into the pin bore.

A particularly advantageous design is obtained if the mushroom head has a diameter larger than the diameter of the piston pin because the mushroom then acts as a retainer against loss of the pin even before the piston is mounted in the cylinder.

Another advantage of the mushroom-type pin retainer as defined by the invention that the retainer functions without the need for longitudinal slots in the shaft, such as shown in German Patent DE 43 14 892. As compared to pin retainers that are anchored in the bore by a press fit, the retainer of the invention offers the further advantage that honing—which is required with such a press fit—is not needed in the present case because an accuracy of 0.2 to 0.3 mm suffices for the design as defined by the invention. Furthermore, dismantling of the mushroom-type pin retainer according to the invention is substantially simpler than with a cylindrical press fit of the mushroom in the bore, because of the quasi line-like or broken line-like abutment on the contact areas.

In a preferred embodiment, the end of the shaft of the mushroom pin retainer is slightly beveled.

The largest diameter of the shaft of the mushroom pin retainer is preferably about 0.1 to 0.3 mm larger than the nominal diameter of the bore of the pin. Both aluminum alloys and plastics can be used as material for the mushroom-type pin retainer. The mushroom-type pin retainer according to the invention is mounted by pressing or pushing it into the bore of the pin.

In the course of mounting, a certain part of the overlap between the mushroom shaft and the bore of the pin is reduced by plastic deformation and abrasion on the shaft of the mushroom. This causes a minor enlargement of the originally narrow line-like area having the largest diameter.

The subsequently remaining overlap effects elastic deformation and thereby prestressing of the mushroom-type retainer in the bore.

BRIEF DESCRIPTION OF THE DRAWINGS

Other objects and features of the present invention will become apparent from the following detailed description considered in connection with the accompanying drawings which disclose one embodiments of the present invention. It should be understood, however, that the drawing is designed for the purpose of illustration only and not as a definition of the limits of the invention.

In the drawings, wherein similar reference numbers denote similar elements throughout the several views.

DETAILED DESCRIPTION OF THE PREFERRED EMBODIMENT

Figure 1:
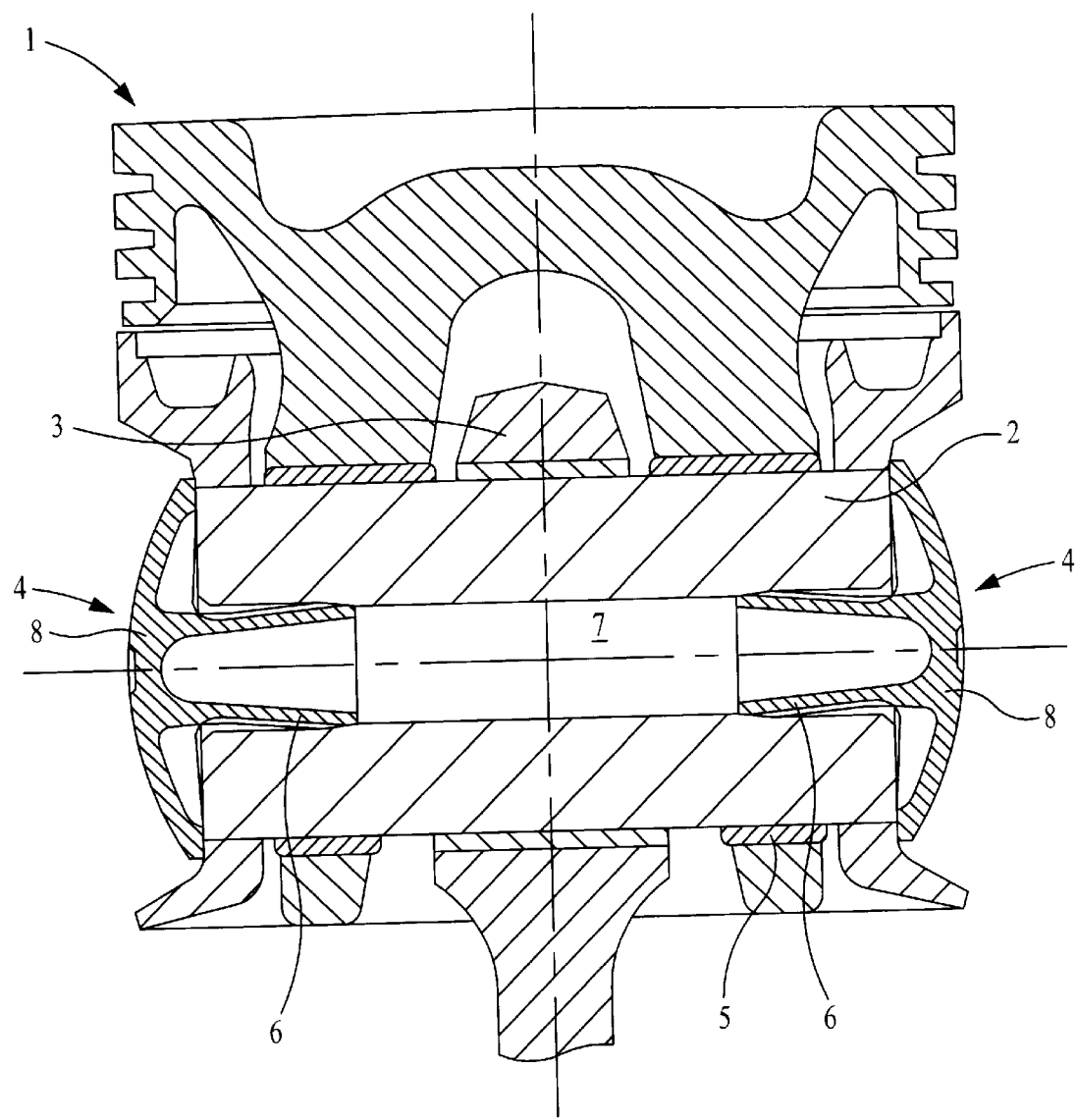
FIG. 1 shows a side cross-sectional view of mushroom-type pin retainers as defined by the invention in the mounted state.

Turning now in detail to the drawings, and in particular, FIG. 1, there is shown a piston 1 of an internal combustion engine connected with a piston rod 3 via a pin 2. Pin 2 is protected against axial displacement in bore 5 of the boss by two mushroom-type pin retainers 4.

Mushroom-type pin retainers 4 have a shaft 6 which is mounted in a bore 7 of the pin, and a mushroom head 8. The diameter of shaft 6 expands in the form of a hollow truncated cone toward the end of the shaft. Mushroom head 8 has a larger diameter that the diameter of the pin, to keep the pin from becoming lost. The end of the shaft is slightly beveled, as shown in FIG. 2.

A small cylindrical section 9, which has the largest diameter, is disposed between the hollow cone-shaped section of shaft 6 and the end of shaft 6. The length of cylindrical section 9 is smaller than 2 mm prior to mounting, thus for example 1.5 mm or 1.0 mm. Due to the small length of this section 9 having the largest diameter, mushroom pin retainer 4 is capable of swinging by a limited angle as it is being mounted in bore 7, so that circular abutment of the outer edge of the mushroom head 4 on piston 1 and pin 2 is ensured, even if alignment flaws exist between mushroom head 8 and mushroom shaft 6.

Figure 2:
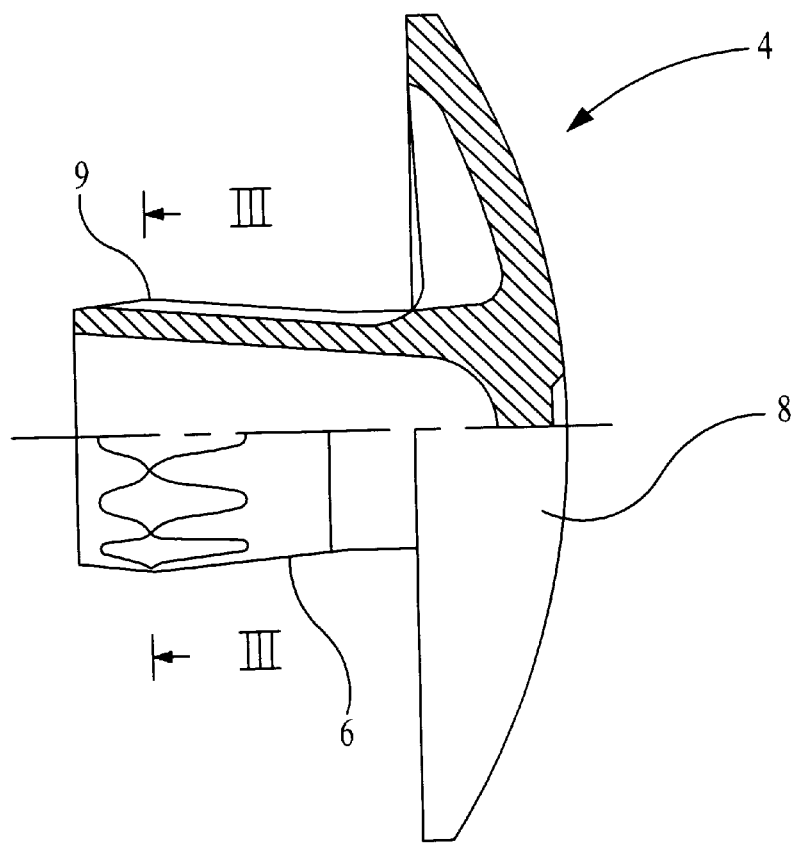
FIG. 2 shows a side view in partial cross-section of a mushroom-type pin retainer with a shaft profiled on the outside.
Figure 3:
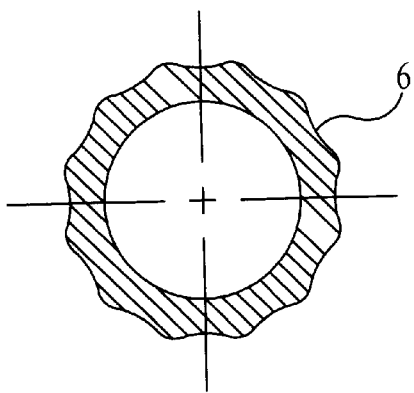
FIG. 3 shows a cross-sectional view along line III—III of FIG. 2.

Furthermore, the outer surface of mushroom shaft 6 may be profiled as shown in FIGS. 2 and 3. This reduces the forces required for pressing the retainer in the bore. Profiling is obtained here by axially extending indentations.

Figure 4:
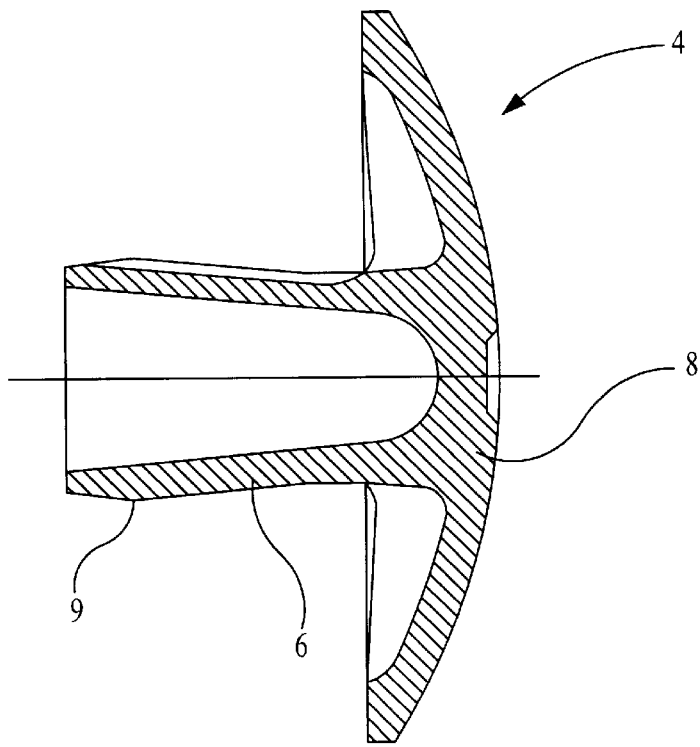
FIG. 4 shows a side cross-sectional view of the mushroom-type pin retainer according to the invention.
Figure 5:
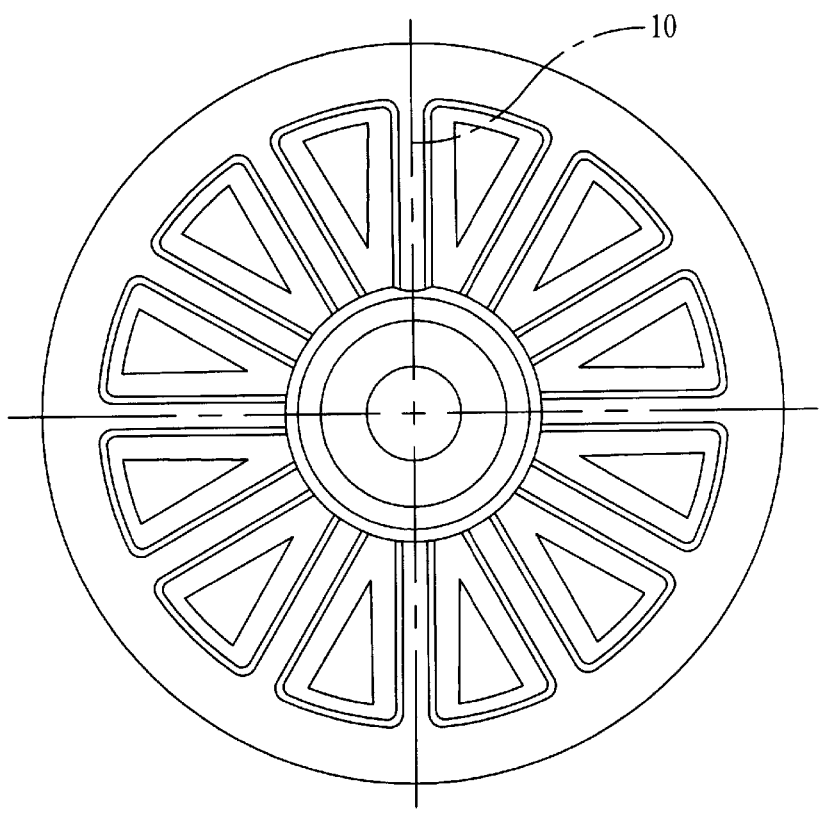
FIG. 5 shows a top view of the mushroom-type pin retainer.
Figure 1:
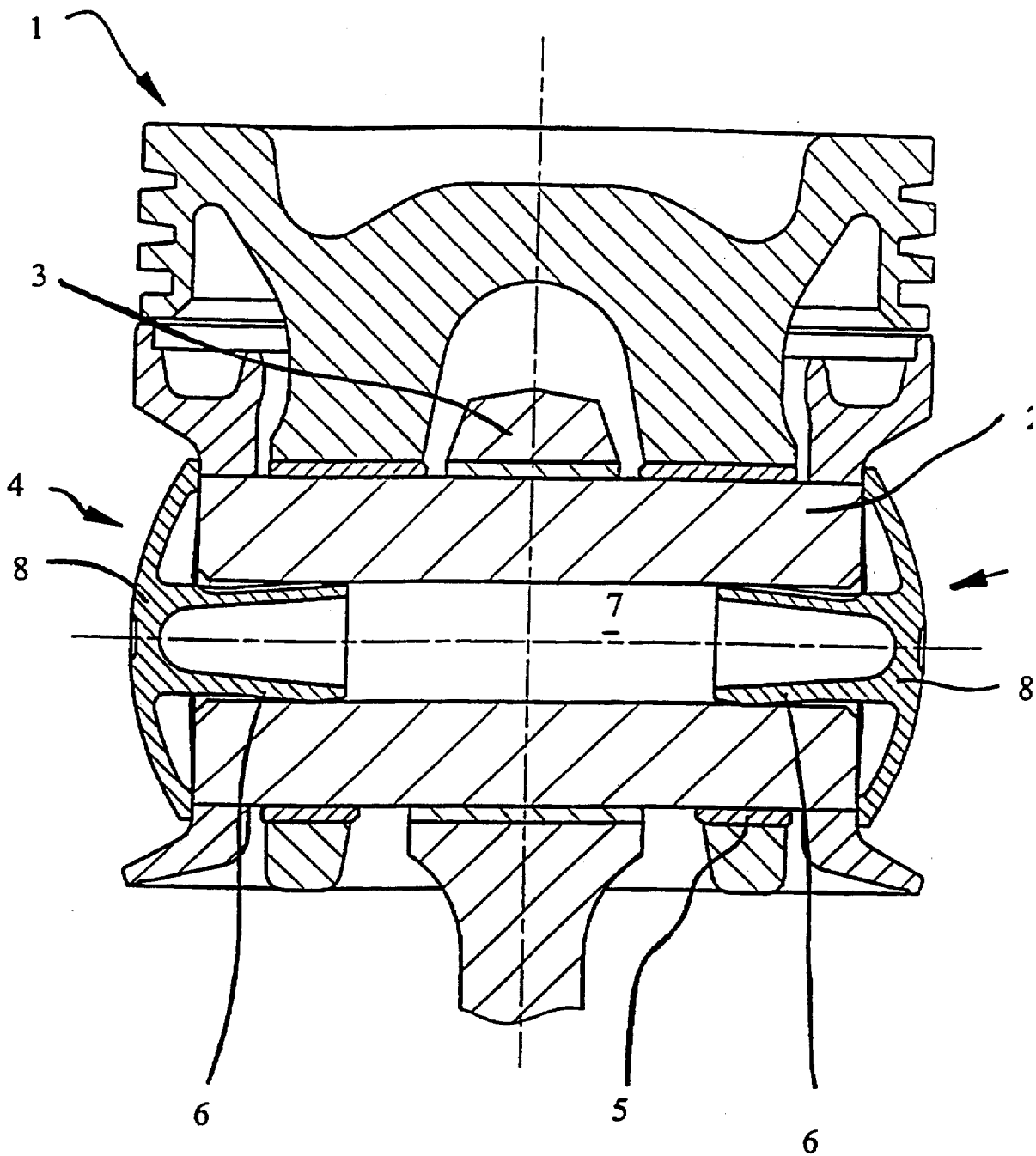

The mushroom head may be hollow as shown in FIG. 4, and may be ribbed in the radial direction with lamellae 10 as shown in FIG. 5.

While only one embodiment of the present invention has been shown and described, it is to be understood that many changes and modifications may be made thereunto without departing from the spirit and scope of the invention as defined in the appended claims.

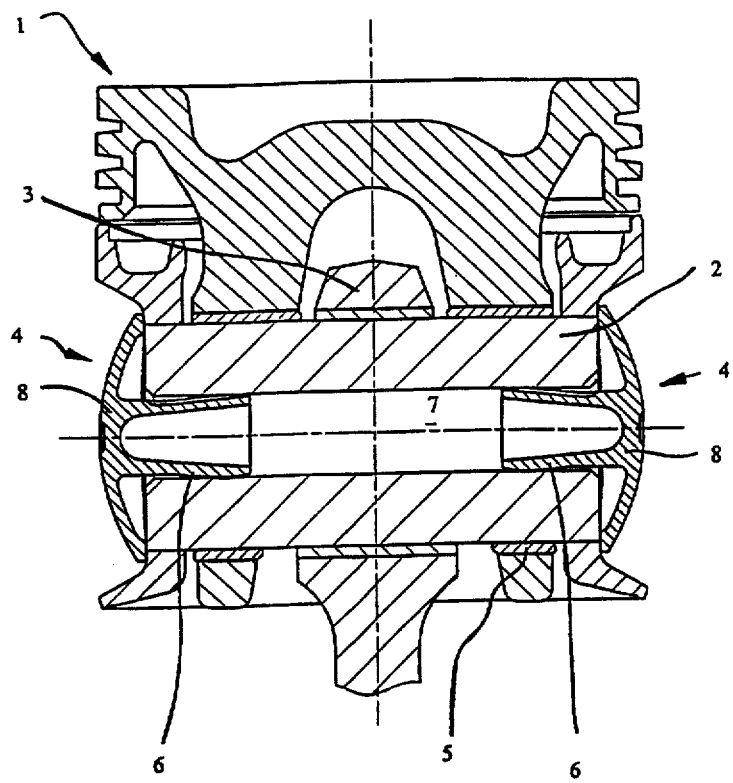

What is claimed is:

1. A mushroom-type pin retainer and a pin for connecting a piston and a piston rod of an internal combustion engine, said pin having at least one central bore along its longitudinal axis in which said pin retainer is fixed, said pin retainer comprising:

a mushroom head; and a shaft having two ends and being connected to the mushroom head at one end, said shaft having a section of largest diameter for insertion into the bore of the pin, said section of largest diameter being no longer than 2 mm in an axial direction and located remote from said mushroom head, so that the pin retainer may swing with limited annular deflection during mounting in the bore and the entire circumference of the mushroom head abuts at least one of the pin and piston, wherein said pin retainer is fixed in the pin solely by a press fit.

2. The pin retainer and pin according to claim 1, wherein the section of largest diameter is no longer than 1 mm in the axial direction.

3. The pin retainer and pin according to claim 2, wherein the shaft has the shape of a hollow truncated cone and wherein the diameter of the shaft expands toward the end of the shaft remote from the mushroom head.

4. The pin retainer and pin according to claim 1, wherein said shaft has an outer circumference and wherein the outer circumference has axially-extending indentations where the shaft contacts the pin.

5. The pin retainer and pin according to claim 4, wherein the shaft is in the shape of hollow truncated cone and wherein the diameter of the shaft expands toward the end of the shaft remote from the mushroom head.

6. The pin retainer and pin according to claim 1, wherein the mushroom head has a larger diameter than the diameter of the pin, such that the mushroom head secures the pin against axial displacement relative to the piston.

7. The pin retainer and pin according to claim 1, wherein the mushroom head is hollow and has radially extending reinforcement lamellae.

8. The pin retainer and pin according to claim 1, wherein the end of the shaft remote from the mushroom head has a bevel for inserting the pin retainer into the bore of the pin.

* * * * *

UNITED STATES PATENT AND TRADEMARK OFFICE
CERTIFICATE OF CORRECTION

PATENT NO. : 6,048,126
DATED : April 11, 2000
INVENTOR(S) : Peter Kemnizt, et al.

It is certified that error appears in the above-identified patent and that said Letters Patent is hereby corrected as shown below:

The title page showing the illustrative figure should be deleted and substitute therefore the attached title page.

In the drawings, Sheet 1 of 3 consisting of Figure 1, should be deleted and substitute therefore the corrrected Figure 1, as shown on the attached page.

Signed and Sealed this

Thirteenth Day of November, 2001

Attest:

NICHOLAS P. GODICI
Attesting Officer     Acting Director of the United States Patent and Trademark Office

United States Patent [19]

Kemnitz et al.

[11] Patent Number: 6,048,126
[45] Date of Patent: Apr. 11, 2000

[54] MUSHROOM-TYPE PIN RETAINER

[75] Inventors: Peter Kemnitz, Leutenbach; Klaus Keller, Lorch, both of Germany

[73] Assignee: Mahle GmbH, Stuttgart, Germany

[21] Appl. No.: 09/022,788

[22] Filed: Feb. 12, 1998

[30] Foreign Application Priority Data

Feb. 13, 1997 [DE] Germany .................. 197 05 488

[51] Int. Cl.$^7$ ............................................. F16C 11/06
[52] U.S. Cl. ...................... 403/154; 403/153; 92/208; 92/219; 92/190
[58] Field of Search ........................... 403/155, 154, 403/153, 150, 157, 161, 383, 375; 92/172, 208, 212, 216, 219, 190, 189, 187

[56] References Cited

U.S. PATENT DOCUMENTS

| 1,478,733 | 12/1923 | Cave | 403/151 |
| 1,573,848 | 2/1926 | Murray | 403/155 |
| 1,720,779 | 7/1929 | Brown | 403/153 |
| 1,851,304 | 3/1932 | Fish | 403/154 X |
| 1,923,717 | 8/1933 | Frelin | |
| 2,295,199 | 9/1942 | Carvelli | 92/187 |
| 2,343,719 | 3/1944 | Ulrich | 92/187 |
| 5,289,758 | 3/1994 | Berlinger | 92/190 |

FOREIGN PATENT DOCUMENTS

| 430514 | 6/1926 | Germany . | |
| 481715 | 8/1929 | Germany . | |
| 657010 | 2/1938 | Germany . | |
| 699345 | 11/1940 | Germany . | |
| 4314892A1 | 11/1993 | Germany . | |
| 325211 | 3/1935 | Italy | 403/154 |
| 1236592 | 6/1971 | United Kingdom . | |

Primary Examiner—Lynne H. Browne
Assistant Examiner—David E. Bochna
Attorney, Agent, or Firm—Collard & Roe, P.C.

[57] ABSTRACT

A mushroom-type pin retainer for a pin having a central bore and which connects a piston and a piston rod of an internal combustion engine. The pin retainer is comprised of a mushroom head connected to a shaft. The shaft has a section of larger diameter for insertion into the bore of the pin. This section is no longer than 2 mm in an axial direction and is located remote from the mushroom head, so that the pin retainer may swing by a limited angle during mounting in the bore. This configuration makes the assembly simple to mount, even if it is manufactured by an imprecise manufacturing process such as injection molding.

8 Claims, 3 Drawing Sheets